US012787121B1

(12) United States Patent
Yost et al.

(10) Patent No.: US 12,787,121 B1
(45) Date of Patent: Nov. 3, 2026

(54) HEATING SYSTEM FOR SPRAY CHAMBER OUTLET

(71) Applicant: ELEMENTAL SCIENTIFIC, INC., Omaha, NE (US)

(72) Inventors: Tyler Yost, Omaha, NE (US); Kyle W. Uhlmeyer, Omaha, NE (US); Daniel R. Wiederin, Omaha, NE (US); Gary J. Barrett, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 1312 days.

(21) Appl. No.: 17/558,894

(22) Filed: Dec. 22, 2021

Related U.S. Application Data

(62) Division of application No. 16/385,866, filed on Apr. 16, 2019, now Pat. No. 11,240,880.

(60) Provisional application No. 62/659,483, filed on Apr. 18, 2018.

(51) Int. Cl.
*H05B 1/02* (2006.01)
*B05B 7/22* (2006.01)
*H05B 3/42* (2006.01)

(52) U.S. Cl.
CPC ............. *H05B 1/0297* (2013.01); *B05B 7/22* (2013.01); *H05B 3/42* (2013.01)

(58) Field of Classification Search
None
See application file for complete search history.

(56) References Cited

U.S. PATENT DOCUMENTS 2,551,078 A * 5/1951 Wing ...................... B05B 7/206 239/366
2,841,215 A * 7/1958 Messer ................. F23D 11/001 431/89
3,144,174 A * 8/1964 Abplanalp ............. B65D 83/72 222/146.2
3,338,476 A * 8/1967 Marcoux ................ B65D 83/72 219/214
3,358,885 A * 12/1967 Flowers ................. B65D 83/72 222/61
3,372,840 A * 3/1968 Kelley ................... B65D 83/72 392/491
3,437,791 A * 4/1969 Gardner .................. F24H 1/142 219/509
3,438,711 A * 4/1969 Hell ....................... G01N 21/72 239/597
3,446,402 A * 5/1969 Healy ....................... B05B 1/30 219/214
3,476,293 A * 11/1969 Marcoux ................ B65D 83/72 392/475
3,790,033 A * 2/1974 Ciaffone ................ B65D 83/72 219/214
4,066,188 A * 1/1978 Scholl .................. B05C 5/0225 392/484

(Continued)

*Primary Examiner* — Thor S Campbell
(74) *Attorney, Agent, or Firm* — Kevin E. West; Advent, LLP

(57) ABSTRACT

Systems and methods for heating a spray chamber outlet are described. A system embodiment includes, but is not limited to, a conductive body portion defining an aperture to receive a spray chamber outlet; and an internal cartridge heater coupled to the conductive body portion, the internal cartridge heater configured to regulate a temperature of the conductive body portion to inhibit condensate formation within the spray chamber outlet.

12 Claims, 5 Drawing Sheets

(56) References Cited

U.S. PATENT DOCUMENTS

| | | | | | |
|---|---|---|---|---|---|
| 4,212,425 | A * | 7/1980 | Schlick | B05B 1/24 | 219/505 |
| 4,871,115 | A * | 10/1989 | Hessey | A63J 5/025 | 392/484 |
| 5,050,776 | A * | 9/1991 | Rosenplanter | B29B 7/603 | 239/134 |
| 5,375,766 | A * | 12/1994 | Sweeney | B05B 7/1666 | 401/2 |
| 5,534,998 | A * | 7/1996 | Eastgate | G01N 21/714 | 250/288 |
| 5,573,185 | A * | 11/1996 | Schwarzkopf | B29C 45/74 | 392/473 |
| 5,927,608 | A * | 7/1999 | Scorsiroli | B60S 1/488 | 239/284.1 |
| 5,979,796 | A * | 11/1999 | Ponziani | B60S 1/488 | 219/202 |
| 6,220,524 | B1 * | 4/2001 | Tores | B60S 1/488 | 239/284.1 |
| 6,318,599 | B2 * | 11/2001 | Estelle | G05D 23/1919 | 239/585.4 |
| 6,393,652 | B1 * | 5/2002 | Vogt | B60S 1/522 | 15/250.04 |
| 6,864,974 | B1 * | 3/2005 | Wiederin | H01J 49/105 | 250/288 |
| 6,912,357 | B2 * | 6/2005 | Bissonnette | B05B 1/24 | 137/341 |
| D513,058 | S * | 12/2005 | Hayduk | D23/226 | |
| 7,201,294 | B2 * | 4/2007 | Carlucci | B65D 83/206 | 219/214 |
| 7,311,268 | B2 * | 12/2007 | Sporer | B60S 1/52 | 239/128 |
| 9,010,661 | B2 * | 4/2015 | Kim | B05B 9/002 | 15/250.05 |
| 9,148,942 | B1 * | 9/2015 | Wiederin | H05H 1/34 | |
| 10,071,713 | B2 * | 9/2018 | Caillot | B05B 1/24 | |
| 2002/0191970 | A1 * | 12/2002 | Raghavan | F28F 7/02 | 392/479 |
| 2011/0248003 | A1 * | 10/2011 | Wiederin | G01N 21/73 | 219/121.51 |
| 2013/0098880 | A1 * | 4/2013 | Korolev | B05B 7/22 | 219/121.5 |
| 2015/0300550 | A1 * | 10/2015 | Shelton | B67D 7/42 | 392/468 |
| 2015/0376761 | A1 * | 12/2015 | Thayer | C23C 4/134 | 118/620 |
| 2017/0198379 | A1 * | 7/2017 | Hazel | B05B 7/222 | |
| 2018/0220520 | A1 * | 8/2018 | Alavi | G01J 3/443 | |
| 2020/0040444 | A1 * | 2/2020 | Stowell | H05H 1/42 | |

* cited by examiner

HEATING SYSTEM FOR SPRAY CHAMBER OUTLET

BACKGROUND

Spectrometry refers to the measurement of radiation intensity as a function of wavelength to identify component parts of materials. Inductively Coupled Plasma (ICP) spectrometry is an analysis technique commonly used for the determination of trace element concentrations and isotope ratios in liquid samples. For example, in the semiconductor industry, ICP spectrometry can be used to determine metal concentrations in samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample. The sample to be analyzed is often provided in a sample mixture.

Sample introduction systems may be employed to introduce liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Systems and methods for heating a spray chamber outlet are described. A system embodiment includes, but is not limited to, a conductive body portion defining an aperture to receive a spray chamber outlet; and an internal cartridge heater coupled to the conductive body portion, the internal cartridge heater configured to regulate a temperature of the conductive body portion to inhibit condensate formation within the spray chamber outlet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. In the figures, the use of the same reference numbers in different instances in the description and the figures may indicate similar or identical items.

DETAILED DESCRIPTION

Overview

Referring to FIGS. 1-6, example implementations of heating a spray chamber outlet prior to sample analysis are described. For analysis of liquid samples with ICP spectroscopy instrumentation, the liquid samples can be transported to a nebulizer for conversion to a polydisperse aerosol suitable for ionization in plasma. The properties of the polydisperse aerosol can affect signal stability and intensity of the nebulized sample when analyzed by the ICP spectroscopy instrumentation. For instance, large aerosol particles can inhibit signal stability and intensity and can inhibit functionality or longevity of the plasma (e.g., extinguishing the plasma). Spray chambers can be utilized to sort large aerosol particles from the nebulized sample, such as through impact with the interior surfaces of the spray chamber, where the separated particles can be drained from the spray chamber. Larger spray chambers can tend to provide more liquid to the ICP plasma than smaller spray chambers, in part due to the increased potential fluid handling capacity of the larger interior volumes. For example, the increased fluid flow through the larger spray chambers can result in decreased ability for the large aerosol particles to impact with the surfaces of the spray chamber, resulting in condensate reaching the plasma, particularly for spray chambers operating without drying periods where little or no sample is introduced to the spray chamber.

Accordingly, the present disclosure is directed to systems and methods for heating a spray chamber outlet prior to sample analysis. The systems include a heating element configured to couple to an outlet of a spray chamber to prevent condensation of fluid within the outlet. Example systems include a conductive block supporting an internal cartridge heater. The conductive block defines an aperture through which the spray chamber outlet passes and can define a recess configured to receive an injector mount to heat a portion of an injector of an ICP torch. The cartridge heater can be operably coupled to a temperature sensor to control a temperature applied to the spray chamber outlet.

Example Implementations

Figure 1:
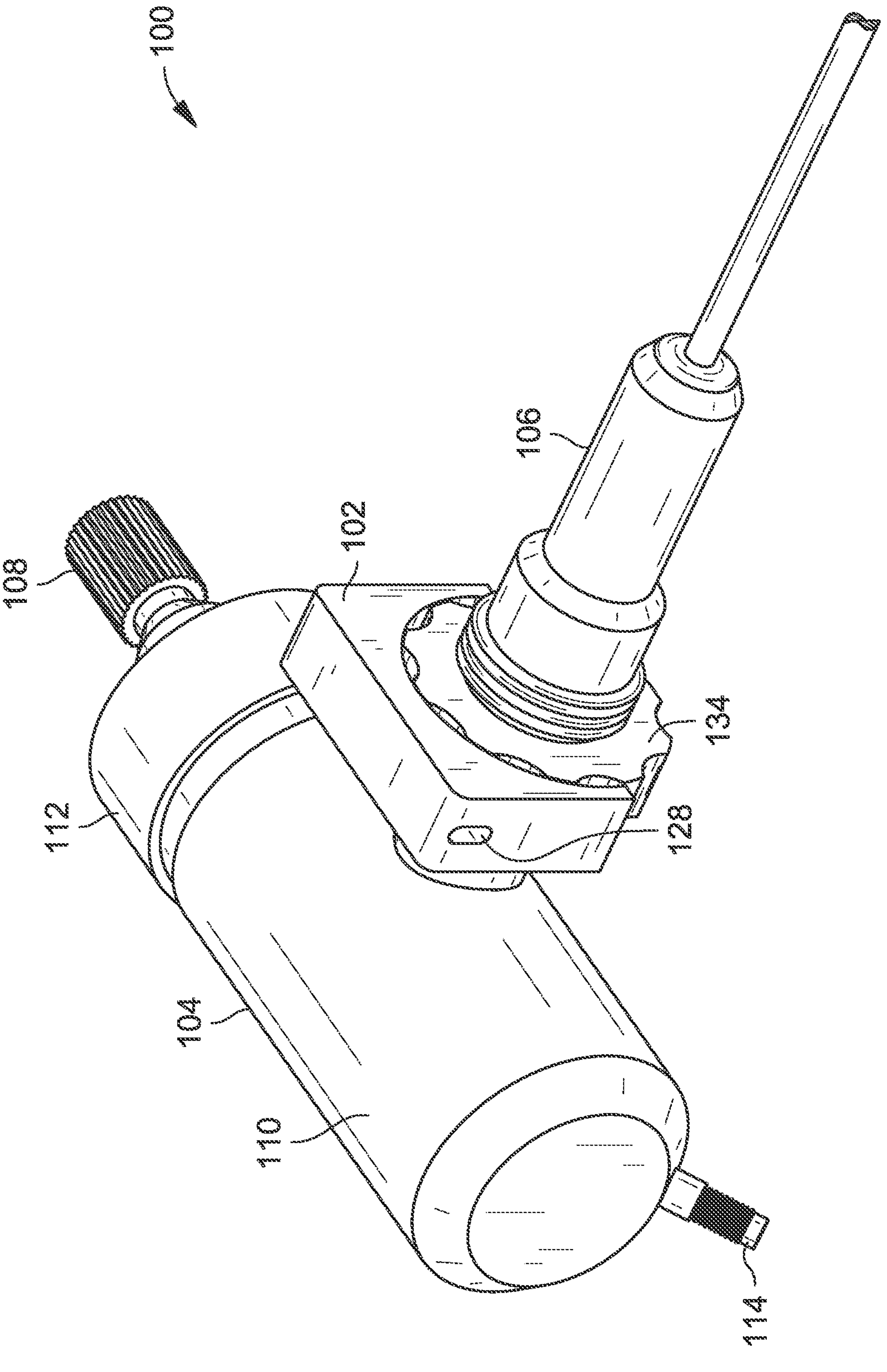
FIG. 1 is an isometric view of a system for heating a spray chamber outlet prior to sample analysis, in accordance with example implementations of the present disclosure.
Figure 2:
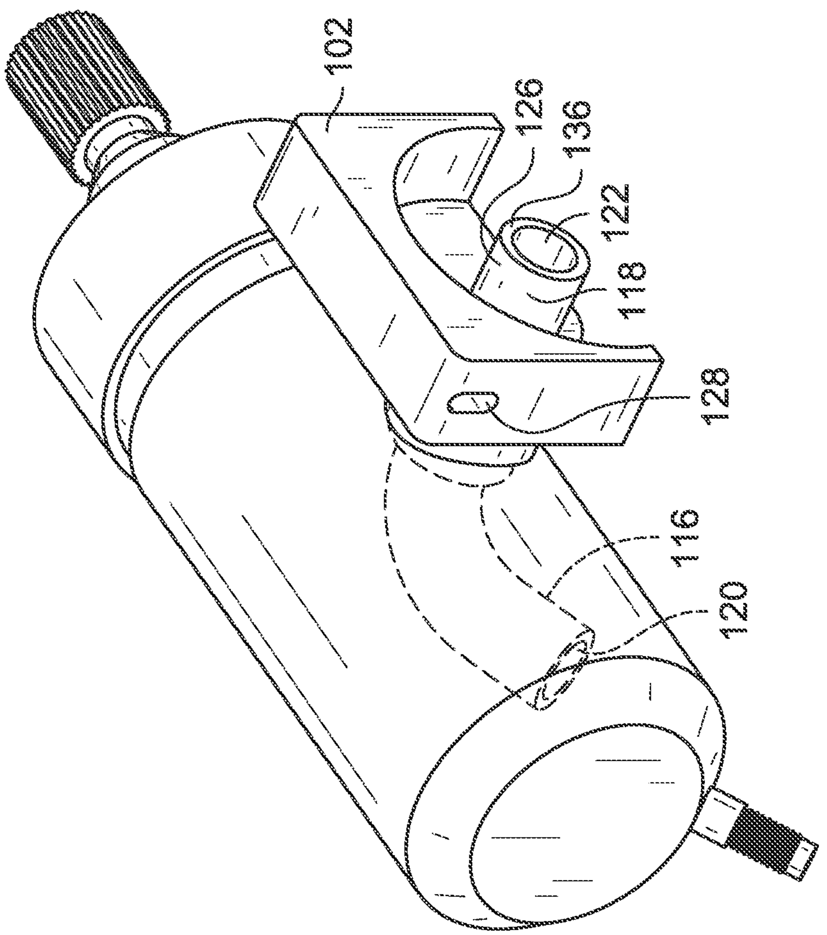
FIG. 2 is an isometric view of a portion of the system of FIG. 1, showing a connection between a heating element and a spray chamber outlet.

FIG. 1 illustrates a system 100 for heating a spray chamber outlet prior to sample analysis by ICP spectroscopy instrumentation (e.g., ICP-MS or ICP-AES). As shown, the system 100 generally includes a heating element 102, a spray chamber 104, and an injector 106. The system 100 receives a liquid sample into the spray chamber 104 through an inlet 108 coupled with a nebulizer to direct a polydisperse aerosol into an interior of the spray chamber. In implementations the spray chamber 104 is a barrel spray chamber (e.g., a perfluoroalkoxy alkane (PFA) barrel spray chamber) having a spray chamber body 110 and a spray chamber cap 112 supporting the inlet 108. In an embodiment, the spray chamber body 110 defines a drain 114 through which condensate can exit the spray chamber body 110. The spray chamber 104 can be cooled through operation of a cooling device (e.g., cooling chamber surrounding at least a portion of the spray chamber 104) to assist with condensation formation in the spray chamber body 110 for removal via the drain 114. Referring to FIG. 2, the spray chamber body 110 can include a curved interior tube 116 coupled to a spray chamber outlet 118. During operation, the portions of the polydisperse aerosol that are not removed from the spray chamber body 110 via the drain 114 can pass into an interior of the tube 116 through a port 120 and proceed into the spray chamber outlet 118 for passage out of an outlet port 122 and into the injector 106.

Figure 3A:
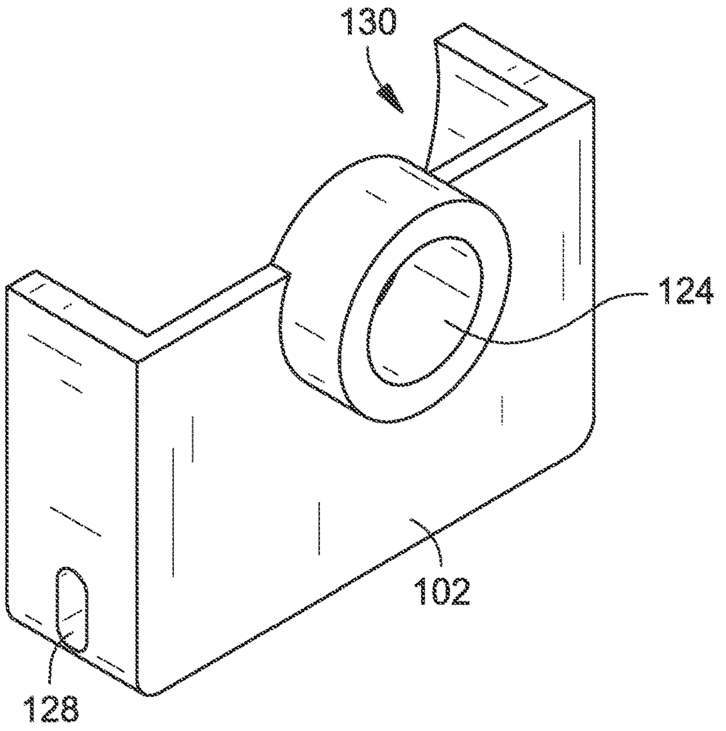
FIG. 3A is a first isometric view of a heating element, in accordance with example implementations of the present disclosure.
Figure 3B:
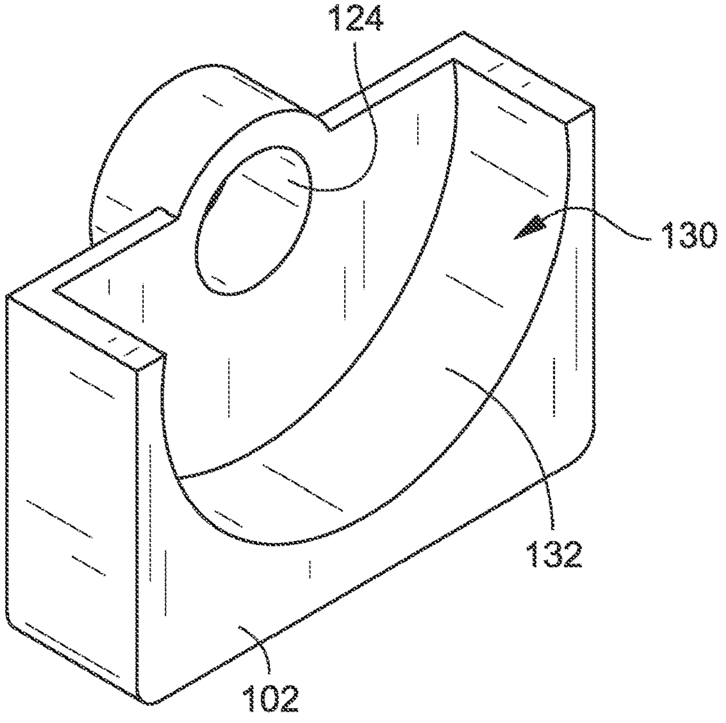
FIG. 3B is a second isometric view of the heating element shown FIG. 3A.
Figure 4:
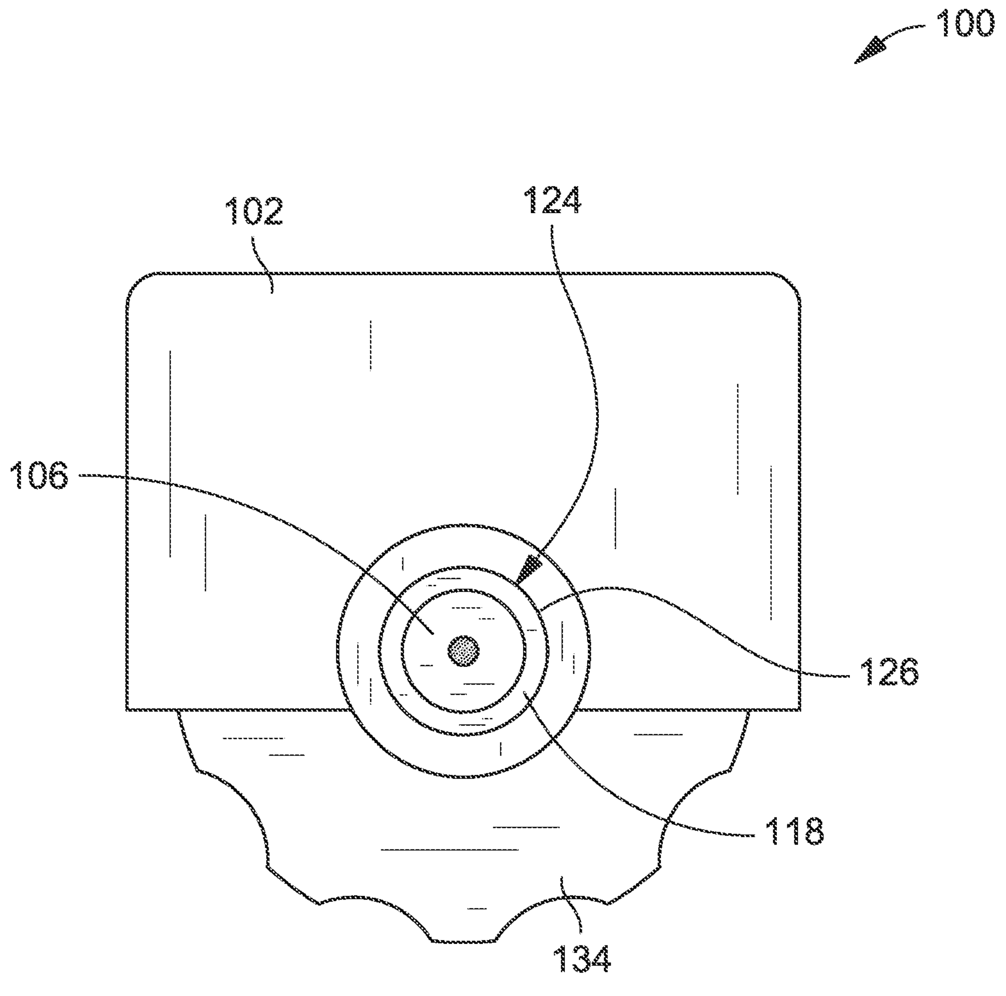
FIG. 4 is a top view of the heating element of FIG. 1 coupled to an injector, in accordance with example implementations of the present disclosure.

The heating element 102 can define an aperture 124 (e.g., as shown in FIGS. 3A and 3B) through which to receive the spray chamber outlet 118 (e.g., as shown in FIG. 2). In implementations, the aperture 124 is dimensioned and otherwise configured to contact an outer surface 126 of the spray chamber outlet 118 to heat the spray chamber outlet 118 and interior regions thereof to prevent condensation of the polydisperse aerosol flowing therethrough. For example, as shown in FIGS. 1 and 4, the aperture 124 of the heating element 102 surrounds a portion of the spray chamber outlet 118 coupled between the spray chamber 104 and the injector 106 to prevent condensation of the polydisperse aerosol during transit from the spray chamber 104 to the injector 106.

Figure 5:
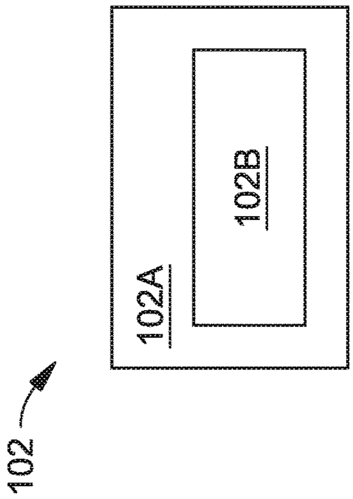
FIG. 5 is a schematic view of a heating element with a conductive block and an internal cartridge heater, in accordance with example implementations of the present disclosure.

In implementations, as schematically shown in FIG. 5, the heating element 102 can include a conductive (e.g., at least thermally conductive) block or body portion 102A (e.g., aluminum, aluminum alloy, steel, steel alloy, other metal, other metallic alloy, or combinations thereof; composites filled with boron nitride, diamond, and/or aluminum nitride; or the like) supporting (e.g., carrying therein) an internal cartridge heater 102B. For example, the heating element 102 can include an aperture 128 configured to receive electrical leads to couple the internal cartridge heater 102B to an electrical supply and a controller to regulate the temperature of the internal cartridge heater 102B, which in turn controls the temperature of the heating element 102. In embodiments, the internal cartridge heater 102B may include, for example, a resistive heating element, a radiative heating element, or another suitable heating element. In implementations, the heating element 102 is coupled to a controller configured to regulate the temperature of the heating element 102 (via the internal cartridge heater 102B) to a temperature range from about 40° C. to about 60° C. However, the temperature range may not be limited to 60° C., and instead could be limited (e.g., to about 200° C. to about 250° C.) to avoid deformation of the material forming the spray chamber outlet 118 (e.g., the melting point of the material used for the spray chamber outlet 118, such as about 300° C.).

In implementations, the heating element 102 defines a recess 130 configured to receive a portion of the injector 106. For example, the recess 130 can include a curved surface 132 configured to receive an injector mount 134 to secure the injector onto an outer end 136 of the spray chamber outlet 118. In implementations, the heating element 102 includes a cover or sheath to prevent contact with external surfaces of the heating element 102, such as to prevent burning an individual through contact with the heating element 102 when in operation.

While the heating element 102 has been described with respect to a conductive block defining the aperture 124, it is noted that the heating element 102 can be configured as a flexible strip heating element (e.g., a flexible resistive heater) that is wrapped around the outer surface 126 of the spray chamber outlet 118 (e.g., still effectively defining an aperture through the heating element 102 for receiving the spray chamber outlet 118) to heat the spray chamber outlet 118 and interior regions thereof. Such a heating element 102 can, like the conductive block variant, be configured to regulate the temperature of the heating element to a temperature in a range of about 40° C. to about 250° C. (e.g., about 40° C. to about 60° C.).

In an embodiment, the system 100 can be used as part of a process for heating a spray chamber outlet prior to sample analysis by ICP spectroscopy instrumentation (e.g., ICP-MS or ICP-AES). A liquid sample can be introduced into a spray chamber (not shown). The liquid sample can be nebulized to introduce a polydisperse aerosol to a body portion of the spray chamber 104. A portion of the polydisperse aerosol can be removed through the spray chamber outlet 118. The spray chamber outlet 118 can be heated (e.g., via the heating element 102) during removal of the portion of the polydisperse aerosol. The process may further include cooling at least a portion of the spray chamber 104 during removal of the portion of the polydisperse aerosol through the spray chamber outlet 118.

Figure 6:
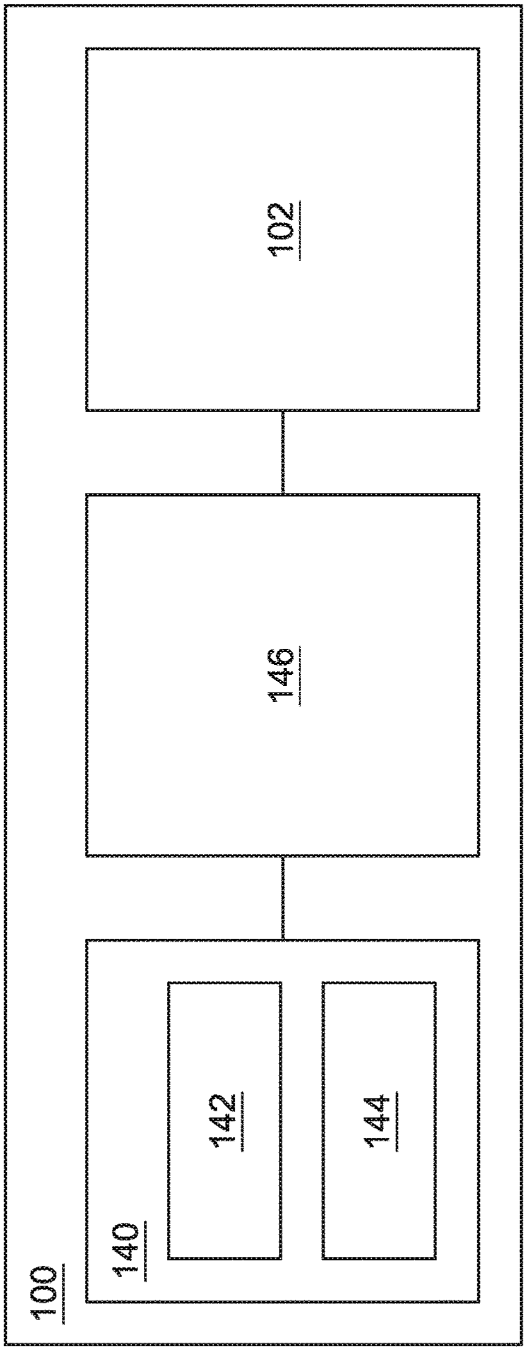
FIG. 6 is a schematic view of a system for heating a spray chamber outlet prior to sample analysis, with temperature control capabilities, in accordance with example implementations of the present disclosure.

As shown in FIG. 6, the system 100 can automatically manage control of the operation of the heating element 102. For example, the system 100 can include a computing device 140 (e.g., a controller), including a processor 142 and a memory 144, and a heating element control module 146 (e.g., a thermostat) operatively coupled to the heating element 102. The processor 142 provides processing functionality for the computing device and may include any number of processors, micro-controllers, or other processing systems, and resident or external memory for storing data and other information accessed or generated by the computing device. The processor 142 may execute one or more software programs that implement the techniques described herein. The processor 142 is not limited by the materials from which it is formed or the processing mechanisms employed therein and, as such, may be implemented via semiconductor(s) and/or transistors (e.g., electronic integrated circuits (ICs)), and so forth.

The memory 144 is an example of device-readable storage media that provides storage functionality to store various data associated with the operation of the computing device, such as the software program and code segments mentioned above, or other data to instruct the processor and other elements of the computing device to perform the techniques described herein. Although a single memory is mentioned above, a wide variety of types and combinations of memory may be employed. The memory 144 may be integral with the processor 142, stand-alone memory, or a combination of both. The memory 144 may include, for example, removable and non-removable memory elements such as RAM, ROM, Flash (e.g., SD Card, mini-SD card, micro-SD Card), magnetic, optical, USB memory devices, and so forth. In embodiments of the computing device, the memory 144 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing device 140 can further includes a display (not shown) to display information to a user of the computing device. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments.

The display may be provided with a touch screen to receive input (e.g., data, commands, etc.) from a user. For example, a user may operate the computing device by touching the touch screen and/or by performing gestures on the touch screen. In some embodiments, the touch screen may be a capacitive touch screen, a resistive touch screen, an infrared touch screen, combinations thereof, and the like. The computing device may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing device 140 may also include a communication module (not shown) representative of communication functionality to permit computing device to send/receive data between different devices (e.g., components/peripherals) and/or over one or more networks. The communication module may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the automatic sampling and digestion environment. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth.

Examples of wireless networks include but are not necessarily limited to: networks configured for communications according to one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device 140 can include a user interface (not shown), which is storable in the memory 144 and executable by the processor 142. The user interface is representative of functionality to control the display of information and data to the user of the computing device via the display. In some implementations, the display may not be integrated into the computing device and may instead be connected externally using universal serial bus (USB), Ethernet, serial connections, and so forth. The user interface may provide functionality to allow the user to interact with one or more applications of the computing device by providing inputs (e.g., maximum operating temperatures, minimum operating temperatures, average operating temperatures, etc.) via the touch screen and/or the I/O devices. For example, the user interface may cause an application programming interface (API) to be generated to expose functionality to the heating element control module 146 or other module to configure the application for display by the display or in combination with another display. In embodiments, the API may further expose functionality to configure a heating element control module 146 to allow the user to interact with an application by providing inputs via the touch screen and/or the I/O devices to provide desired temperature conditions of the spray chamber outlet 108 and/or injector 106. The heating element control module 146 or other module may comprise software, which is storable in memory and executable by the processor, to perform a specific operation or group of operations to furnish the desired temperature-control functionality to the computing device 140. The heating element control module 146 may include a temperature gauge (e.g., a thermocouple) for monitoring the temperature of heating element 102. In embodiments, the heating element control module 146 may include the temperature gauge and appropriate communication and electrical linkage (e.g., wired and/or wireless communication) between the heating element 102 and the computing device 140 (e.g., both external to the computing device 140), with the control functionality thereof being performed internally within the computing device (e.g., controller) 140.

In implementations, the user interface may include a browser (e.g., for implementing functionality of the heating element control module). The browser enables the computing device to display and interact with content such as a webpage within the World Wide Web, a webpage provided by a web server in a private network, and so forth. The browser may be configured in a variety of ways. For example, the browser may be configured as a heating element control module accessed by the user interface. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between components in the system 100, for example, can be wired, wireless, or some combination thereof. In the case of a software implementation, for instance, a module may represent executable instructions that perform specified tasks when executed on a processor, such as the processor described herein. The program code can be stored in one or more device-readable storage media, an example of which is the memory associated with the computing device.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An Inductively Coupled Plasma (ICP) spectrometry system comprising:

a spray chamber configured to receive an aerosolized liquid sample, the spray chamber defining a spray chamber body having an exterior wall, and a spray chamber outlet extending from the exterior wall;

an ICP torch injector coupled to the spray chamber outlet, the injector configured to deliver the aerosolized liquid sample to an ICP torch; and a heating element having a conductive body portion, the heating element configured to regulate a temperature of the conductive body portion to inhibit condensate formation within the spray chamber outlet, the heating element defining an aperture through which to receive at least a portion of the injector, the conductive body portion at least partially surrounding a portion of the spray chamber outlet coupled between the spray chamber and the injector.

2. The system of claim 1, wherein a temperature of the heating element is configured to be regulated to a temperature in a range of about 40° C. to about 250° C.

3. The system of claim 1, wherein the heating element includes at least one of an internal cartridge heater or a flexible strip heating element.

4. The system of claim 1, wherein the spray chamber body defines a drain through which a condensate can exit.

5. The system of claim 1, wherein the spray chamber comprises a barrel spray chamber.

6. The system of claim 5, wherein the barrel spray chamber is a perfluoroalkoxy alkane (PFA) barrel spray chamber.

7. The system of claim 1, wherein the spray chamber further comprises a spray chamber inlet, the spray chamber inlet configured to couple with a nebulizer to direct a polydisperse aerosol into an interior of the spray chamber.

8. An Inductively Coupled Plasma (ICP) spectrometry system comprising:

a spray chamber configured to receive an aerosolized liquid sample, the spray chamber defining a spray chamber body having an exterior wall, and a spray chamber outlet extending from the exterior wall;

an ICP torch injector coupled to the spray chamber outlet, the injector configured to deliver the aerosolized liquid sample to an ICP torch; and a heating element having a conductive body portion, the heating element configured to regulate a temperature of the conductive body portion to inhibit condensate formation within the spray chamber outlet, the heating element defining an aperture through which to receive the spray chamber outlet and at least a portion of the injector, the conductive body portion at least partially surrounding a portion of the spray chamber outlet coupled between the spray chamber and the injector.

9. The system of claim 8, wherein a temperature of the heating element is configured to be regulated to a temperature in a range of about 40° C. to about 250° C.

10. The system of claim 8, wherein the heating element includes at least one of an internal cartridge heater or a flexible strip heating element.

11. The system of claim 8, wherein the spray chamber body defines a drain through which a condensate can exit.

12. The system of claim 8, wherein the spray chamber further comprises a spray chamber inlet, the spray chamber inlet configured to couple with a nebulizer to direct a polydisperse aerosol into an interior of the spray chamber.

* * * * *